(12) United States Patent
Kasunich et al.

(10) Patent No.: US 7,479,756 B2
(45) Date of Patent: Jan. 20, 2009

(54) SYSTEM AND METHOD FOR PROTECTING A MOTOR DRIVE UNIT FROM MOTOR BACK EMF UNDER FAULT CONDITIONS

(75) Inventors: John M. Kasunich, Mayfield Heights, OH (US); Daniel Pixler, West Bend, WI (US); Brian T. Concannon, Menomonee Falls, WI (US); Michael J. Melfi, Euclid, OH (US); Semyon Royak, Beachwood, OH (US); Mark M. Harbaugh, Richfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 233 days.

(21) Appl. No.: 11/425,092

(22) Filed: Jun. 19, 2006

(65) Prior Publication Data

US 2007/0291426 A1 Dec. 20, 2007

(51) Int. Cl.
*H02P 1/26* (2006.01)
(52) U.S. Cl. .................. 318/732; 318/731; 318/766; 318/820
(58) Field of Classification Search ............. 318/732, 318/731, 766, 820, 821, 823; 363/37; 361/33
See application file for complete search history.

(56) References Cited

U.S. PATENT DOCUMENTS

| 4,308,491 | A | * | 12/1981 | Joyner et al. | ............. 318/732 |
| 4,958,119 | A | | 9/1990 | Fitzner | |
| 2004/0239272 | A1 | * | 12/2004 | Schulz et al. | ............. 318/439 |

* cited by examiner

*Primary Examiner*—Karen Masih
(74) *Attorney, Agent, or Firm*—Quarles & Brady LLP; Alexander R. Kuszewski

(57) ABSTRACT

A system and method for protecting a motor drive unit from an associated motor includes a motor drive unit protection system. The motor drive unit protection system includes at least one switch configured to be connected between a motor drive unit and a plurality of motor leads of the motor driven by the motor drive unit. The motor drive unit protection system also includes a controller configured to monitor the motor drive unit or the motor to determine a fault condition indicative of the motor potentially operating as a generator. Upon determining the fault condition, the controller is configured to cause the at least one switch to connect the plurality of motor leads together to protect the motor drive unit from the motor when the motor is operating as a generator.

20 Claims, 7 Drawing Sheets

SYSTEM AND METHOD FOR PROTECTING A MOTOR DRIVE UNIT FROM MOTOR BACK EMF UNDER FAULT CONDITIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to motor systems and, more particularly, to a system and method for controlling the effects of motor back electromotive force (EMF) on a motor drive unit. The present invention utilizes high-speed semiconductor switches to short the motor leads in the event of a fault condition. As such, the generative potential of the motor is contained and the motor drive unit is protected from the high voltage produced by the motor during high speeds.

There are a variety of applications that require a motor to deliver constant power over a wide operational range. Permanent magnet (PM) synchronous motors have often been utilized in such applications because, by properly adjusting the combination of magnetic saliency and permanent magnet flux in the PM motor design, the resulting constant power speed ratio can reach values of ten or higher.

However, when designing and/or utilizing PM motors, there are several factors that must be taken into consideration for a practical application requiring a wide constant power speed ratio. For example, in a typical PM motor drive unit configuration utilizing a traditional six-switch, full-bridge inverter to excite a three-phase PM motor, when the motor is rotating at high speed, the amplitude of the line-to-line back EMF generated by the spinning PM rotor magnets may significantly exceed the source voltage supplied over the DC link. Generally, the effects of the back EMF generated during high-speed operation are automatically limited by the applied DC link voltage. That is, the inverter switches operate in a controlled, flux-weakening mode that serves to keep the back EMF of the motor from injecting a potentially damaging current flow back toward the inverter.

However, should a fault arise while the motor is operating at high-speeds that causes the gate excitation to be removed from the controlled inverter switches, the generative potential of the motor will no longer be controlled. In the case of such a fault causing the inverter to "shut-down", the high amplitude of the motor back EMF causes current to flow back through the freewheeling diodes of the inverter to the DC link. That is, at high speeds, the PM motor acts as a high voltage generator and will deliver power back toward the motor drive unit unless controlled. The resulting "reverse" current flow continues until the rotor speed has been sufficiently reduced and the current flow is extinguished.

This "reverse" current flow and the associated high voltage from PM motor may damage the capacitors of the DC link and/or switches of the inverter. Therefore, the PM motor has the potential to damage or destroy the power electronics of the motor drive unit and may even create an unsafe condition in high kinetic energy applications.

Various attempts have been made to control the generative potential of a PM motor under fault conditions. For example, large dynamic braking kits have been used to brake or stop the motor upon detection of a fault. However, such braking systems require additional system design and maintenance. Furthermore, while these braking systems reduce the impact of a fault, they are unable to react to fault conditions quickly enough to stop the motor from injecting the "reverse" current flow back toward the motor drive unit. In particular, the voltage generated by the motor at high speeds following a fault condition has a time constant between fractions of millisecond to a few milliseconds. As such, the components of the motor drive unit may still be damaged by being subjected to a significant voltage increase that occurs while the braking system attempts to control the motor.

Alternatively, high voltage components have been used that are rated to withstand the maximum motor terminal voltage under uncontrolled generative operation. However, the cost of high voltage DC link capacitors and high voltage inverter switches significantly increases the cost of the drive design. Additionally, the use of high voltage silicon switches in the inverter significantly increases the losses incurred along the inverter and; thereby, decreases the power density and overall efficiency of the motor drive unit.

Therefore, it would be desirable to have a system and method to protect a motor drive unit from the generative potential of a PM motor under fault conditions.

BRIEF SUMMARY OF THE INVENTION

The present invention overcomes the aforementioned drawbacks by providing a system and method for controlling the generative potential of a PM motor under fault conditions to protect the components of the motor drive unit. In particular, the present invention includes a system and method for intentionally shorting the motor leads upon detection of a fault such that the potentially harmful high voltage generated by the PM motor is dissipated primarily in the resistance of the motor.

In accordance with one aspect of the present invention, a motor system is disclosed that includes a motor configured to drive a load. The motor includes a plurality of leads designed to receive operational power to drive the motor. The motor system also includes a motor drive unit configured to condition power received from a power supply and deliver operational power through the plurality of leads to drive the motor. A fault protection system is arranged between the motor and the motor drive unit that includes at least one switch configured to isolate the plurality of leads from one another in a first position and short the plurality of leads together in a second position. The fault protection system also includes a controller configured to monitor the motor or the motor drive unit to detect a fault condition and control the at least one switch to move from the first position to the second position upon detecting the fault condition to protect the motor drive unit from power generated by the motor during the fault condition.

In accordance with another aspect of the present invention, a motor drive unit protection system is disclosed that includes at least one switch configured to be connected between a motor drive unit and a plurality of motor leads of a motor driven by the motor drive unit. The motor drive unit protection system also includes a controller configured to monitor the motor drive unit or the motor to determine a fault condition indicative of the motor potentially operating as an uncontrolled generator. Upon determining the fault condition, the controller is configured to cause the at least one switch to connect the plurality of motor leads together to protect the motor drive unit from the motor when the motor is operating as a generator.

In accordance with yet another aspect of the invention, a motor system is disclosed that includes a permanent magnet motor configured to drive a load. The permanent magnet motor includes a plurality of leads designed to receive operational power to drive the permanent magnet motor. The motor system also includes a motor drive unit configured to condition power received from a power supply and deliver operational power through the plurality of leads to drive the permanent magnet motor. A fault protection system is arranged between the permanent magnet motor and the motor drive unit that includes at least one switch configured isolate the plurality of leads from one another in a first position and short the plurality of leads together in a second position. The fault protection system also includes a controller configured to monitor the plurality of leads to detect a voltage increase or a current increase indicative of a fault condition. Accordingly, the controller is configured to control the at least one switch to move from the first position to the second position upon detecting the voltage increase or the current increase indicative of the fault condition to contain power generated by the permanent magnet motor within the permanent magnet motor during the fault condition.

In accordance with still another aspect of the invention, a method is disclosed for protecting a motor drive unit from an associated permanent magnet motor during a fault condition. The method includes monitoring a power condition present between the motor drive unit and the permanent magnet motor to identify a fault indicative of a shutdown of an inverter included in the motor drive unit. Accordingly, upon detecting the fault, the method includes shorting each of a plurality of phases of the motor together to contain power generated by the permanent magnet motor within the permanent magnet motor during the fault.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

While the following description is generally directed to motor systems, it is contemplated that the following invention can be used with a wide variety of specific motors. For example, as will be described with respect to FIG. 2, it is contemplated that the invention may be used with vehicular power systems, such as hybrid vehicle systems, or many other motor systems.

Figure 1:
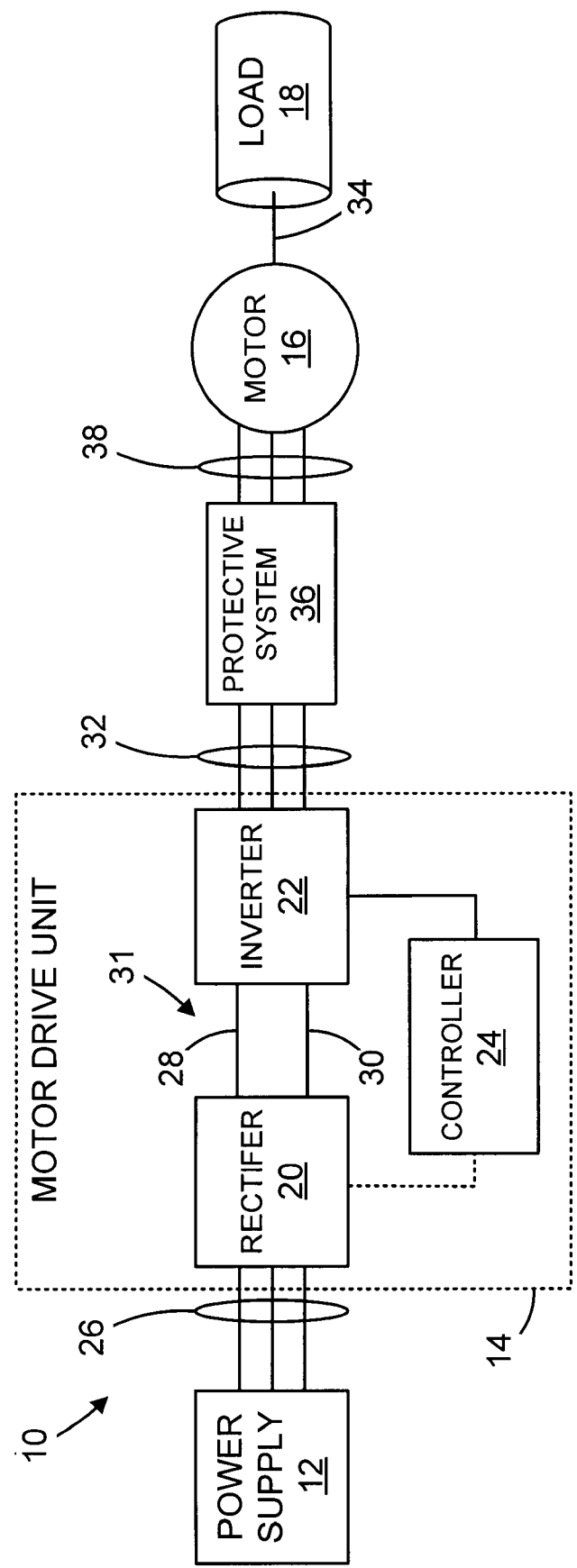
FIG. 1 is a schematic diagram of a motor system including a protective system in accordance with the present invention.

Referring now to FIG. 1, the present invention can be described in the context of a motor system 10. The motor system 10 generally includes a power supply 12, a motor drive unit 14, and a permanent magnet motor 16. The power supply 12 provides power to the motor drive unit 14 that, in turn, converts the power to a more usable form for the permanent magnet motor 16 that drives an associated load 18.

The motor drive unit 14 includes a variety of components, such as a rectifier 20, an inverter 22, and a controller 24. During operation, the power supply 12 provides three-phase AC power, for example, as received from a utility grid over transmission power lines 26. However, it is also contemplated that the power supply 12 may deliver single-phase power. The rectifier 20 is designed to receive the AC power from the power supply 12 and convert the AC power to DC power that is delivered to positive and negative DC buses 28, 30 of a DC link 31. It is also contemplated that the power supply may deliver DC power. In that case, the rectifier 20 would not be used, and the power supply 12 would connect directly to the DC link 31. The inverter 22, in turn, is positioned between the positive and negative DC buses 28, 30 to receive the DC power delivered by the rectifier 20. The inverter 22 includes a plurality of switching devices (e.g., IGBTs or other semiconductor switches) that are positioned between the positive and negative buses 28, 30 and controlled by the controller 24 to open and close specific combinations of the switches to sequentially generate pulses on each of the supply lines 32 to drive the motor 16 and, in turn, the load 18 through a drive shaft 34.

A protective system 36 is arranged between the supply lines 32 leading from the inverter 22 and the leads 38 of the motor 16. As will be described, the protective system 36 is positioned to protect the inverter 22 from the motor 16 upon detection of a fault. In particular, the protective system 36 is designed to short the motor leads 38 upon detection of a fault to thereby protect the motor drive unit 14 from the potentially harmful high voltages that can be generated by the PM motor 16 when operating at high speeds.

Figure 2:
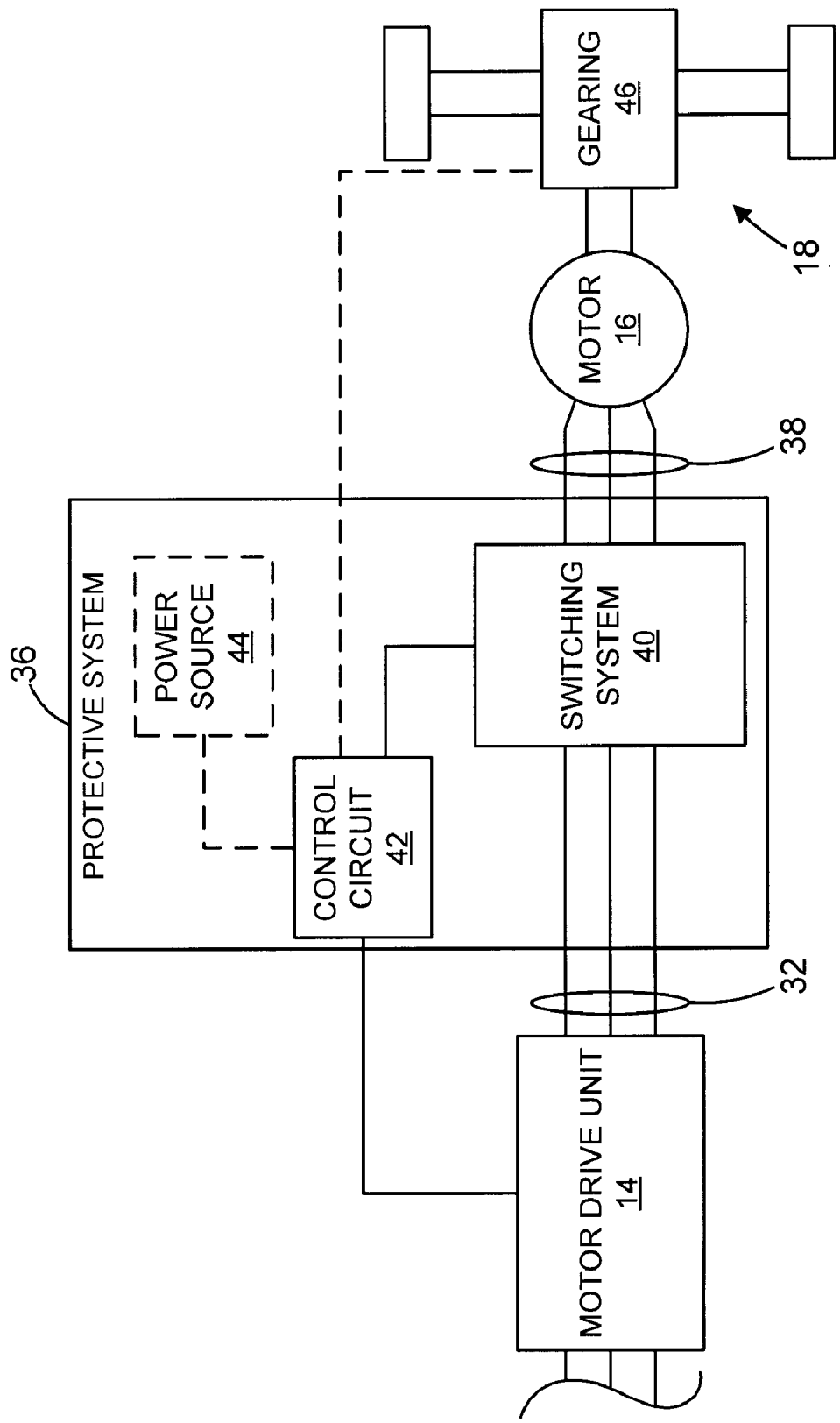
FIG. 2 is a schematic diagram of the protective system of FIG. 1 configured to operate with a vehicular motor system.

Referring now to FIG. 2, the protective system 36 includes a switching system 40 designed to short the motor leads 38 in the event of a fault. As will be described below, the switching system 40 may include a plurality of solid-state switches and/or mechanical contacts designed to short the motor leads 38 such that the potentially harmful high voltages generated by the PM motor 16 when operating at high speeds are dissipated in the internal resistance of the motor 16. In this regard, the protective system 36 includes a control circuit 42 designed to monitor the motor drive unit 14 and/or the motor 16 to determine conditions indicative of a fault and control the switching system 40 accordingly.

The control circuit 42 may be self actuating or may be powered by a power source 44 separate from the motor system 10. That is, the control circuit 42 may be passive and utilize the power of the DC link 31 to trigger switching or it may be a more complex system that receives power from an external power source 44.

For example, the control circuit 42 may be a trigger circuit that fires the switching system 40 when the voltage across the DC link 31 of FIG. 1 rises above a predetermined threshold, or may be a more complex circuit that also operates a contactor or gearbox control in combination with the switching system 40. In the latter case, beyond controlling the switching system 40, the control circuit 42 may also be designed to control disengagement of a kinetic energy source associated with the motor 16, (e.g. gearing 46 of vehicular drive system). In any case, should the control circuit 42 require a power source to operate, it is desirable to provide the power from the external power source 44 despite the associated cost and complexity, since the switching system 40 must be controlled even if there is a fault that would remove power from the DC bus of the motor drive unit 14.

In operation, the control circuit 42 monitors the motor drive unit 14 and/or motor 16 to determine conditions indicative of a fault. For example, the control circuit 42 may monitor conditions of power along the DC link 31 of FIG. 1 to detect an inverter shutdown. Upon detecting a fault condition, the control circuit 42 causes the switching system 40 to short the motor leads 38 to protect the motor drive unit 14 from the power generated by the motor 16 during the fault. As will be described, this may be achieved using any of a variety of circuit designs and arrangements.

Substantially simultaneously with the shorting the motor leads 38, or shortly thereafter, the control circuit 42 may also control the gearing 46 to disengage from the motor 16. Once the gearing 46 has been disengaged and the motor 16 has reduced to base speed, the control circuit 42 may cause the switching system 40 to remove the short between the motor leads 38 and, later, once the fault condition has been corrected, the switching system 40 may reengage the gearing 46.

Figure 3:
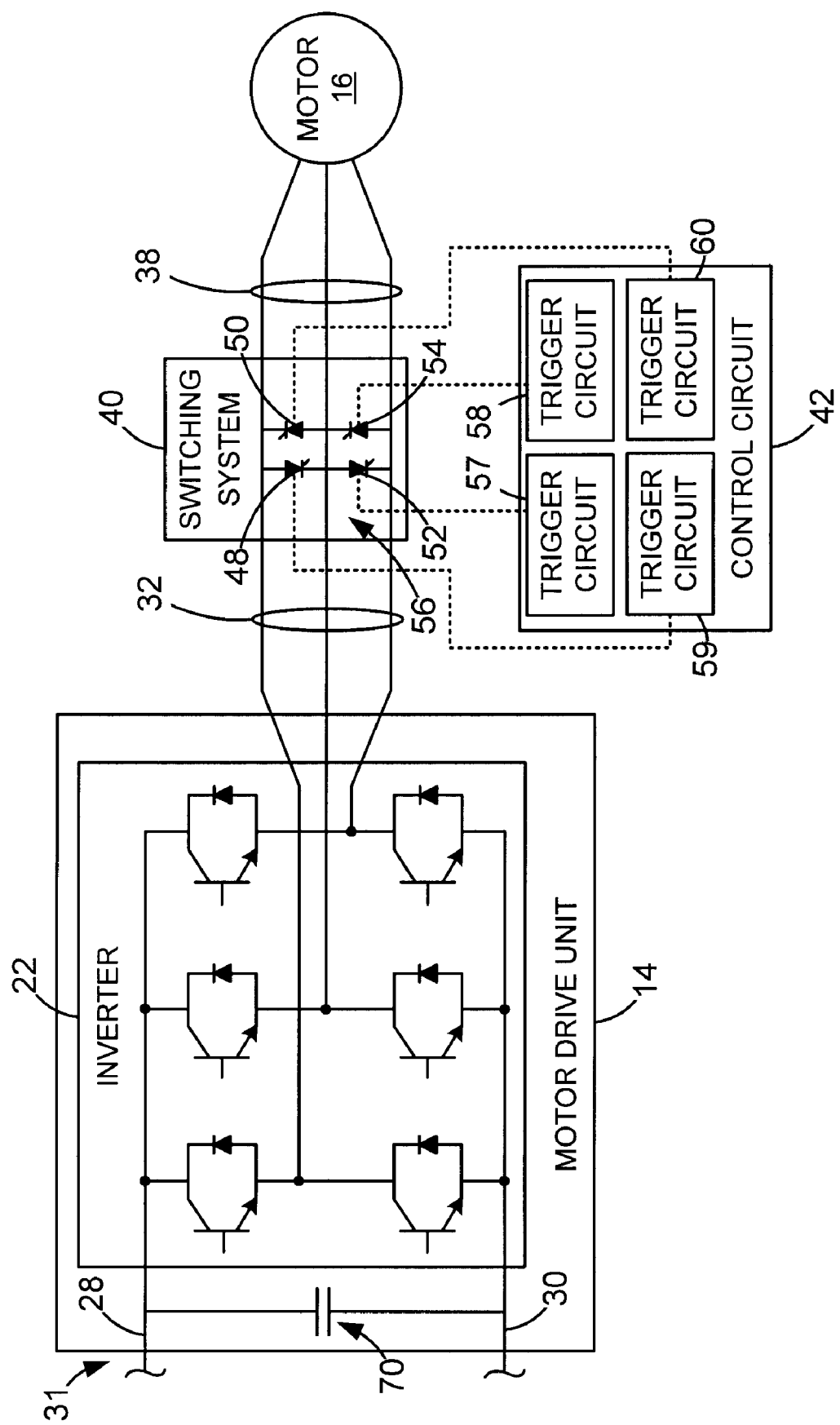
FIG. 3 is a circuit diagram of one configuration of the protective system and an associated motor system.

Referring now to FIG. 3, one circuit configuration for the switching system 40 includes a plurality of semiconductor switches 48, 50, 52, 54 arranged between the inverter 22 and the motor 16. The semiconductor switches 48, 50, 52, 54 are arranged back-to-back directly across the motor leads 38 to form a crowbar circuit 56. As illustrated, the semiconductor switches 48, 50, 52, 54 may be silicon controlled rectifiers (SCRs), or any other suitable controllable switching devices.

Advantageously, the circuit configuration of the switching system 40 shown in FIG. 3 can be easily retrofitted into an existing motor system without substantial reconfigurations. That is, the switching system 40 can simply be connected to motor leads 38. However, the circuit configuration requires a significant number of semiconductor switches 57, 58, 59, 60 at a substantial cost. Furthermore, the circuit configuration requires several electrically isolated circuits 57, 58, 59, 60 that together form the controller circuit 42 designed to control this particular configuration of the switching system 40.

Figure 4:
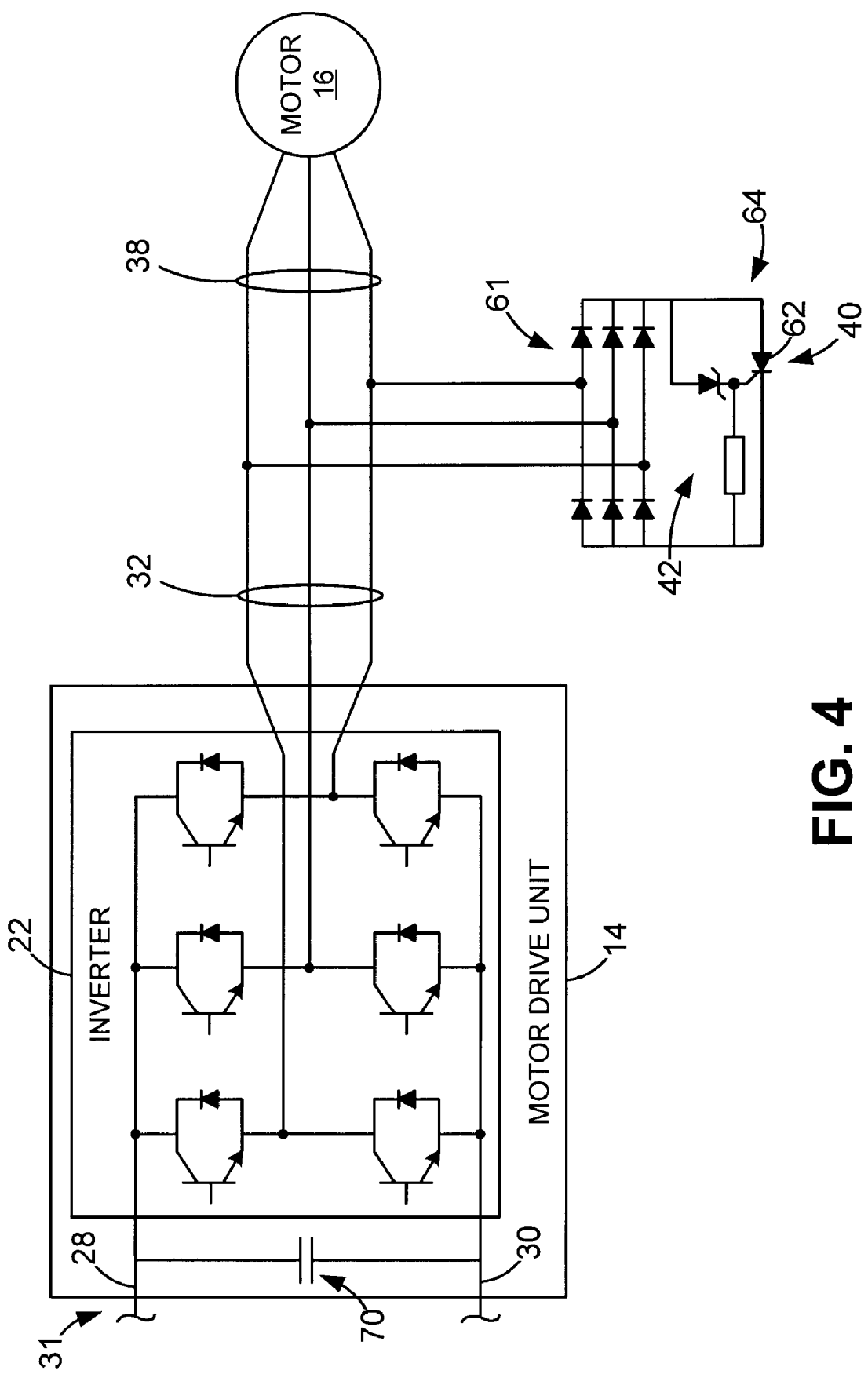
FIG. 4 is a circuit diagram of another configuration of the protective system and an associated motor system.

On the other hand, referring to FIG. 4, the back-to-back switch configuration of FIG. 3 can be replaced with a 6-diode bridge rectifier 61. Within this configuration, a single semiconductor switch 62 acts as a crowbar 64 designed to short the motor leads 38 upon occurrence of a fault. Although the inclusion of a plurality of diodes forming the rectifier 61 adds cost over the configuration described with respect to FIG. 3, the elimination of three of the four semiconductor switches 57, 58, 59, 60 offsets the cost of the diodes. Furthermore, the control circuit 42 required to control the crowbar 64 can be simplified over that required to control the crowbar 56 of FIG. 3 because only one semiconductor switch 62 needs to be triggered and because the rectified voltage provided by the rectifier 61 can be used as a direct indicator of the need to fire the crowbar 64. That is, as soon as an inverter fault appears, the voltage at the motor leads 38 starts rising and the semiconductor switch 62 turns "ON" through an associated zener diode 65. The semiconductor switch 62 will stay "ON" until the speed and voltage of the motor 16 drop to zero. Accordingly, the primary design consideration of the circuit shown in FIG. 4 is that the semiconductor switch 62 and bridge 61 are able to continuously endure the rated motor current.

Figure 5:
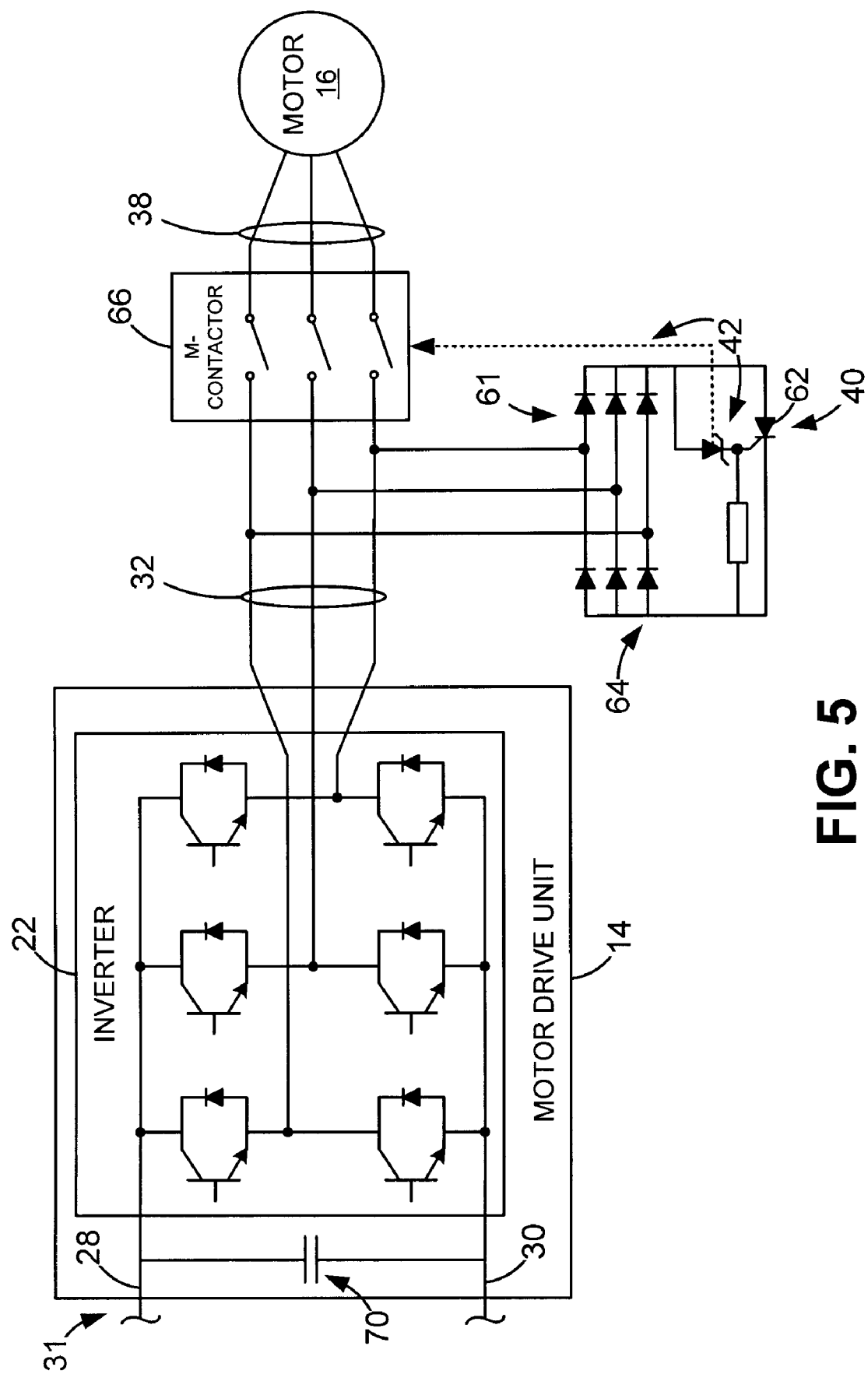
FIG. 5 is a circuit diagram of a further configuration of the protective system and an associated motor system.

Referring now to FIG. 5, the illustrated configuration is similar to that shown in FIG. 4; however, the configuration includes a contactor 66 to electrically disconnect the motor drive unit 14 and crowbar 64 from the motor 16 shortly after the crowbar 64 fires. That is, as soon as inverter fault appears, the contactor 66 is controlled by the control circuit 42 to disconnect the motor 16 from the inverter 22. Alternatively, as described with respect to FIG. 2, the motor 16 may be mechanically disconnected from the associated load (for example, via a clutch, coupling, or gearbox) to achieve substantially the same results.

Since the disconnection time for different contactors is often between 50 to 400 milliseconds, the crowbar 64 serves to shunt the power injected by the motor 16 back toward the inverter 22 until the contactor 66 is fully open. In this regard, the crowbar 64 must only stay "ON" during the time required for the contactor 66 to open and disconnect the motor 16 from inverter 22. Hence, the semiconductor 62 and diodes of the bridge rectifier 61 only need to endure the rated motor current for the relatively short period of time required to open the contactor 66. Accordingly, the size and cost of these components 61, 62 can be substantially smaller than those described above with respect to FIGS. 3 and 4.

Figure 6:
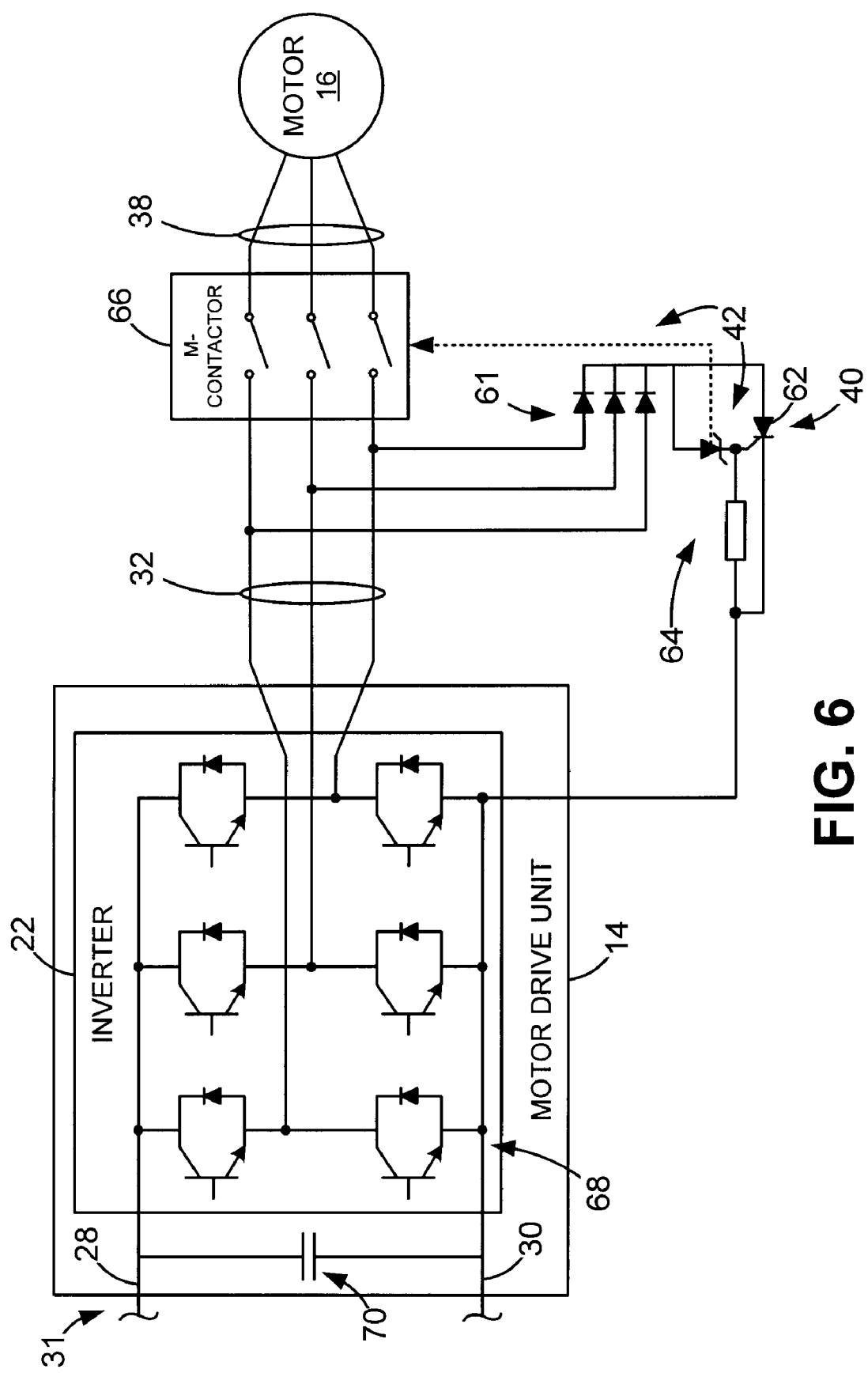
FIG. 6 is a circuit diagram of an additional configuration of the protective system and an associated motor system.

Referring to FIG. 6, the configuration described with respect to FIG. 5 may be further reduced by using the three low-side diodes 68 in the motor drive unit 14 to replace three of the power diodes of the rectifier 61 in the configuration shown in FIGS. 4 and 5. In this regard, the cost and complexity of the switching system 40 is further reduced. However, this cost reduction requires the switching system 40 to be more closely integrated with the motor drive unit 14, as opposed to being a stand-alone unit that can be readily retrofitted to any motor system via connections to the motor leads 38. Rather, this configuration requires connection to the DC link 31 of the motor drive unit 14 as well as the motor leads 38.

Figure 7:
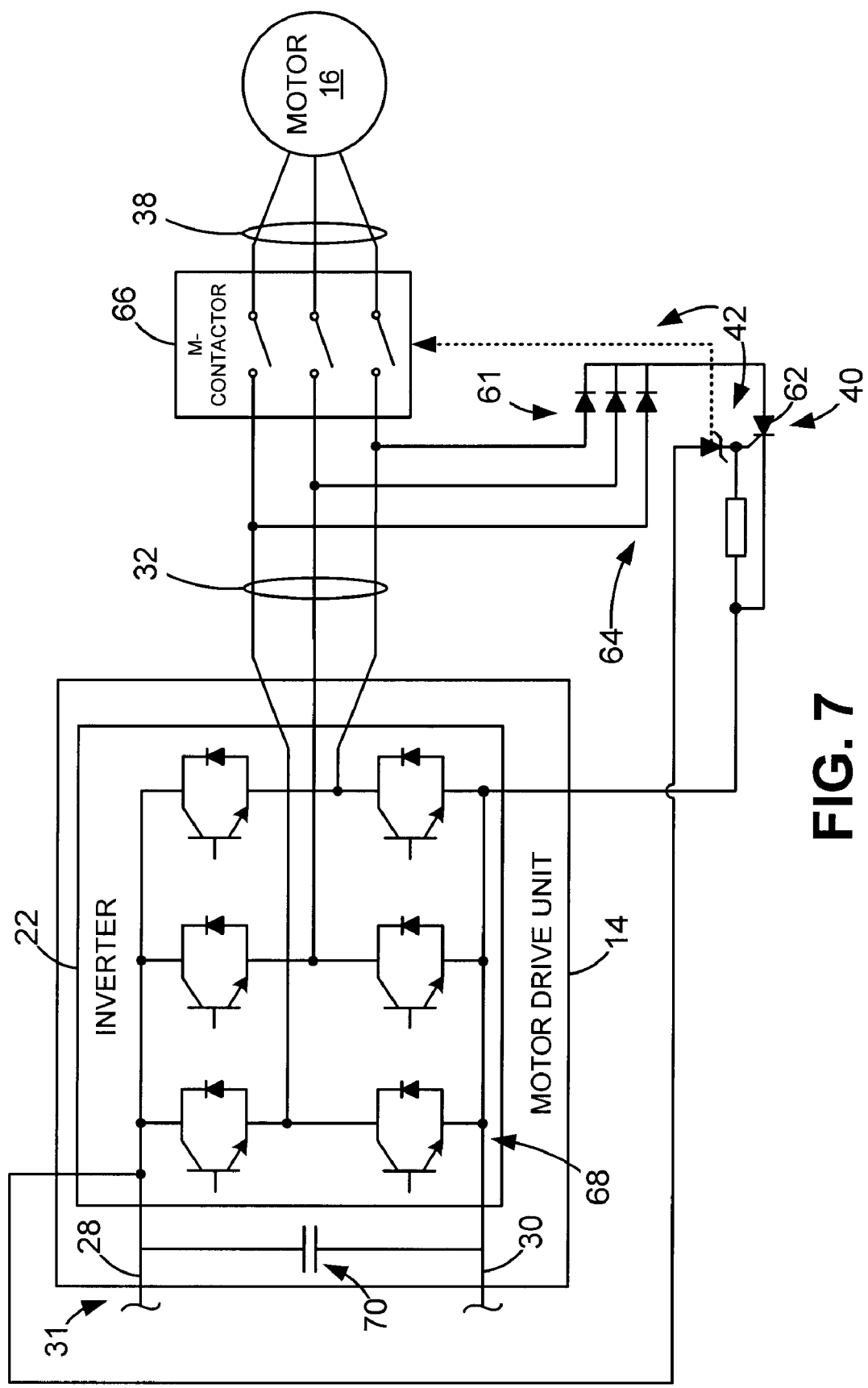
FIG. 7 is a circuit diagram of another configuration of the protective system and an associated motor system.

Referring now to FIG. 7, the configuration shown in FIG. 6 can be further augmented to trigger based on the voltage on the DC link 31, instead of from the rectifier 61. By triggering based on the voltage along with the DC link 31, the probability of a noise induced false firing of the semiconductor switch 62 is reduced because the capacitance 70 of the DC link 31 is advantageously used as a noise filter.

It should be noted that if multiple semiconductor switches are used to form the crowbar and, as shown in FIG. 3, isolated or individualized trigger circuits are associated with each switch, any of the configurations shown in FIGS. 3-6 could be designed to be triggered based on the voltage along DC link 31. However, the configuration shown in FIG. 7 allows triggering based on the voltage along the DC link 31 without the additional cost and complexity of multiple, isolated control circuits.

Additionally, the configuration shown in FIGS. 6 or 7 could be further augmented to connect the semiconductor switch 62 across the main DC link 31. Though not illustrated, this configuration would cause the diodes of the inverter 22 to act in a dual role of functioning in the inverter 22 and the crowbar 64. However, when a fault occurs, the energy in the DC link capacitor 70 would be dissipated in the semiconductor switch 62. Accordingly, such a configuration would subject both the semiconductor switch 62 and the DC bus capacitor 70 to relatively large currents. Hence, this configuration is less desirable than those described above because it would require the tolerance of the DC bus capacitor 70 and semiconductor switch 62 to be increased to withstand this stress.

Therefore, the present invention provides a system and method for controlling the impact of motor back EMF on a motor drive unit under fault conditions. By intentionally shorting the motor leads in the event of a fault condition, the motor contains its generative energy. When coupled with proper PM motor design, the short circuit current will be at an easily manageable level, for example, near the continuous rating of the motor. The insulation system of the motor can readily withstand the voltage and the motor simply dissipates the voltage as heat until it is mechanically disengaged from the load.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A motor system comprising:
    a motor configured to drive a load and having a plurality of leads designed to receive operational power to drive the motor;
    a motor drive unit configured to condition power received from a power supply and deliver operational power through the plurality of leads to drive the motor;
    a fault protection system arranged between the motor and the motor drive unit comprising:
        at least one switch configured to isolate the plurality of leads from one another in a first position and short the plurality of leads together in a second position; and
        a controller configured to monitor at least one of the motor and the motor drive unit to detect a fault condition and control the at least one switch to move from the first position to the second position upon detecting the fault condition to protect the motor drive unit from power generated by the motor during the fault condition.

2. The motor system of claim 1 wherein shorting the plurality of leads together causes power generated by the motor during the fault condition to be contained within the motor.

3. The motor system of claim 1 wherein the power generated by the motor during the fault condition is dissipated in internal windings of the motor as heat.

4. The motor system of claim 1 further comprising a contactor configured to connect the plurality of leads to the motor drive unit in a first position and disconnect the plurality of leads from the motor drive unit in a second position and wherein the controller is further configured to cause the contactor to move from the first position to the second position upon detecting the fault condition.

5. The motor system of claim 4 wherein the controller is further configured to monitor the motor upon detecting the fault condition to determine a return to base speed and cause the contactor to move from the second position to the first position upon determining the motor has returned to base speed.

6. The motor system of claim 1 wherein the controller includes a plurality of diodes forming a rectifier connected to the plurality of leads to provide a fault indication signal configured to cause the at least one switch to move from the first position to the second position.

7. The motor system of claim 6 wherein the motor drive unit includes a plurality of diodes forming an inverter, and wherein at least a portion of the plurality of diodes forming the inverter and the plurality of diodes forming the rectifier of the controller are shared between the inverter and the rectifier.

8. The motor system of claim 1 wherein the controller is further configured to disengage the motor from the load upon detecting the fault condition.

9. The motor system of claim 1 wherein the at least one switch includes a power semiconductor switch.

10. The motor system of claim 1 wherein the motor is a permanent magnet motor.

11. A motor drive unit protection system comprising:
    at least one switch configured to be connected between a motor drive unit and a plurality of motor leads of a motor driven by the motor drive unit;
    a controller configured to monitor at least one of the motor drive unit and the motor to determine a fault condition indicative of the motor potentially operating as a generator; and
    wherein, upon determining the fault condition, the controller is configured to cause the at least one switch to connect the plurality of motor leads together to protect the motor drive unit from the motor when the motor is operating as a generator.

12. The motor drive unit protection system of claim 11 wherein at least one switch and the controller are configured to be retrofitted onto a variety of motor and motor drive unit configurations.

13. A motor system comprising:
    a permanent magnet motor configured to drive a load and having a plurality of leads designed to receive operational power to drive the permanent magnet motor;
    a motor drive unit configured to condition power received from a power supply and deliver operational power through the plurality of leads to drive the permanent magnet motor;
    a fault protection system arranged between the permanent magnet motor and the motor drive unit comprising:
        at least one switch configured to isolate the plurality of leads from one another in a first position and short the plurality of leads together in a second position; and
        a controller configured to monitor the plurality of leads to detect at least one of a voltage increase and a current increase indicative of a fault condition and control the at least one switch to move from the first position to the second position upon detecting the at least one of the voltage increase and the current increase indicative of the fault condition to contain power generated by the permanent magnet motor within the permanent magnet motor during the fault condition.

14. The motor system of claim 13 wherein the contained power generated by the permanent magnet motor is dissipated through internal resistance of the permanent magnet motor.

15. The motor system of claim 13 wherein the fault protection system further comprises a contactor configured to connect the plurality of leads to the motor drive unit in a first position and disconnect the plurality of leads from the motor drive unit in a second position, and wherein the controller is further configured to cause the contactor to move from the first position to the second position upon detecting the at least one of the voltage increase and the current increase.

16. The motor system of claim 13 wherein the controller is further configured to disengage the motor from the load upon detecting the voltage increase.

17. The motor system of claim 13 wherein the controller includes a plurality of diodes forming a rectifier connected between the plurality of leads and the at least one switch and wherein the at least one switch is configured to move from the first position to the second position in response to at least one of a voltage increase and a current increase indicative of the fault condition received from the rectifier.

18. A method for protecting a motor drive unit having an inverter from an associated permanent magnet motor having a plurality of phases during a fault condition, the method comprising the steps of:

monitoring a power condition present between the motor drive unit and the permanent magnet motor to identify a fault indicative of a shutdown of the inverter;

upon detecting the fault, shorting each of the plurality of phases of the motor together to contain power generated by the permanent magnet motor within the permanent magnet motor during the fault.

19. The method of claim 18 further comprising the steps of disconnecting at least one of the permanent magnet motor from the motor drive unit and the permanent magnet motor from an associated load upon detecting the fault.

20. The method of claim 18 wherein each step is performed automatically.

* * * * *